US011173688B2

(12) United States Patent
Bhattacharya et al.

(10) Patent No.: US 11,173,688 B2
(45) Date of Patent: Nov. 16, 2021

(54) ULTRA VIOLET LIGHT RESISTANT LAMINATE, AND PROCESS OF MANUFACTURING THE SAME

(75) Inventors: Satya Prasad Bhattacharya, Mumbai (IN); Mrinal Kanti Banerjee, Mumbai (IN)

(73) Assignee: ESSEL PROPACK LTD., Mumbai (IN)

( * ) Notice: Subject to any disclaimer, the term of this patent is extended or adjusted under 35 U.S.C. 154(b) by 705 days.

(21) Appl. No.: 14/123,429

(22) PCT Filed: May 31, 2012

(86) PCT No.: PCT/IN2012/000379
§ 371 (c)(1),
(2), (4) Date: Mar. 6, 2014

(87) PCT Pub. No.: WO2012/164585
PCT Pub. Date: Dec. 6, 2012

(65) Prior Publication Data
US 2014/0170399 A1 Jun. 19, 2014

(30) Foreign Application Priority Data
Jun. 2, 2011 (IN) .......................... 1629/MUM/2011

(51) Int. Cl.
*B32B 27/08* (2006.01)
*B32B 27/34* (2006.01)
(Continued)

(52) U.S. Cl.
CPC .............. *B32B 27/08* (2013.01); *B32B 27/18* (2013.01); *B32B 27/20* (2013.01); *B32B 27/34* (2013.01);
(Continued)

(58) Field of Classification Search
CPC ......... B32B 27/08; B32B 27/18; B32B 27/20; B32B 27/34; B32B 2307/71; Y10T 428/31757; Y10T 428/24975
See application file for complete search history.

(56) References Cited

U.S. PATENT DOCUMENTS 5,004,647 A * 4/1991 Shah ........................ B32B 27/08
428/349
5,017,429 A * 5/1991 Akao ....................... B32B 15/08
428/349

(Continued)

FOREIGN PATENT DOCUMENTS

| CN | 1379714 A | 11/2002 |
|---|---|---|
| WO | 2012164585 A2 | 12/2012 |

OTHER PUBLICATIONS

Mitsubishi Gas Chemical. Basic Properties. http://www.mgc.co.jp/eng/products/nop/nmxd6/nature.html. accessed Oct. 28, 2016.*

*Primary Examiner* — Nancy R Johnson
(74) *Attorney, Agent, or Firm* — Knobbe, Martens, Olson & Bear, LLP

(57) ABSTRACT

The present disclosure relates to a laminate comprising: an outer polyethylene layer comprises at least 10% on the weight of polyethylene, a UV radiation blocking agent or a chromophore; a barrier layer with at least 15%-50% of an aromatic polyamide; and a polyethylene sealant layer. The Ultra Violet radiation resistant laminate is an opaque laminate or a transparent laminate. The outer polyethylene layer and the barrier layer with at least one aromatic polyamide is a multilayer film, preferably three layer film.
The present disclosure also relates to a process for the preparation of the laminate.

11 Claims, 2 Drawing Sheets

(51) Int. Cl.
  *B32B 27/20* (2006.01)
  *B32B 27/18* (2006.01)
(52) U.S. Cl.
  CPC ... *B32B 2307/71* (2013.01); *Y10T 428/24975* (2015.01); *Y10T 428/31757* (2015.04)

(56) References Cited

U.S. PATENT DOCUMENTS

| | | | | |
|---|---|---|---|---|
| 5,491,011 | A | * | 2/1996 | Pezzoli ............... B32B 27/32 428/215 |
| 5,741,566 | A | * | 4/1998 | Hogstrom ........... B29C 47/0021 428/35.2 |
| 6,602,447 | B2 | * | 8/2003 | Danielson .......... C08G 65/2612 252/589 |
| 6,872,459 | B1 | * | 3/2005 | Frisk ..................... B32B 27/08 428/474.4 |
| 2010/0272936 | A1 | * | 10/2010 | White ..................... B32B 27/08 428/35.4 |
| 2011/0027428 | A1 | * | 2/2011 | Bekele ...................... B32B 7/12 426/127 |

* cited by examiner

ULTRA VIOLET LIGHT RESISTANT LAMINATE, AND PROCESS OF MANUFACTURING THE SAME

CROSS-REFERENCE TO RELATED APPLICATIONS

This application is the U.S. National Phase under 35. U.S.C. § 371 of International Application PCT/IN2012/000379, filed May 31, 2012, which claims priority to Indian Patent Application No. 1629/MUM/2011, filed Jun. 2, 2011. The disclosures of the above-described applications are hereby incorporated by reference in their entirety.

TECHNICAL FIELD

The present disclosure relates to an Ultra violet (UV) radiation resistant laminate. The present disclosure also relates to a process for preparation of such laminate. The laminate has radiation resistance against UV-A, UV-B, and UV-C.

BACKGROUND

There are some materials which are sensitive to UV rays. For example, some cosmetics, pharmaceuticals or food or beverage etc which are packed in laminated tubes may deteriorate on prolonged exposure to UV rays. Especially in big shopping malls, where very bright lights are being used for decoration or illumination purposes. Sometimes defused sunlight falls on the shelf and tube package stored there in. High power halogen lights or defused sunlight emits harmful UV A+B+C rays. Prolonged exposures to UV rays are known to cause product discoloration and deterioration. Therefore, the packaging material for such products, such as the laminate needs to act as an UV inhibitor in order to prevent the transmission of UV light which affects the materials stored in it.

Another means employed to protect such products from UV radiation is by packaging products in opaque packages. However, the demand for transparent packaging of products is on rise rather than opaque packing owing to different factors including aesthetic value, customer demand etc. Hence, producing a packaging material such as a laminate that is transparent and UV resistant is desired.

In general, UV inhibition against UV 'A' ray is achieved through inclusion of certain additives. However, the addition of such additives result in blooming or migration of additives to the surface of laminates and contaminates the materials stored in the laminate tube. Such migration is not acceptable in laminates. This is one of the major limitations in using such additives.

SUMMARY

The present disclosure provides a laminate capable of preventing UV-radiation in UV-A region (from 380 nm-315 nm), UV-B region (from 315 nm-280 nm), and UV-C region (from 280 nm-200 nm).

The present disclosure relates to an ultra violet radiation resistant laminate comprising: an outer polyethylene layer comprises at least 10% on the weight of polyethylene, a UV radiation blocking agent or a chromophore; a barrier layer with at least 15%-50% of an aromatic polyamide; and a polyethylene sealant layer. The UV radiation blocking agent is preferably a UV-A radiation inhibiting agent.

In one aspect of the disclosure, the polyethylene layer, the barrier layer and the sealant layer can independently comprise of multiple layers.

The present disclosure also relates to a process for the preparation of the laminate.

These and other features, aspects, and advantages of the present subject matter will become better understood with reference to the following description. This statement is provided to introduce a selection of concepts in a simplified form. This statement is not intended to identify key features or essential features of the subject matter, nor is it intended to be used to limit the scope of the subject matter.

BRIEF DESCRIPTION OF THE DRAWINGS

The above and other features, aspects, and advantages of the subject matter will become better understood with regard to the following description, appended claims, and accompanying drawings where:

DETAIL DESCRIPTION

Figure 1:
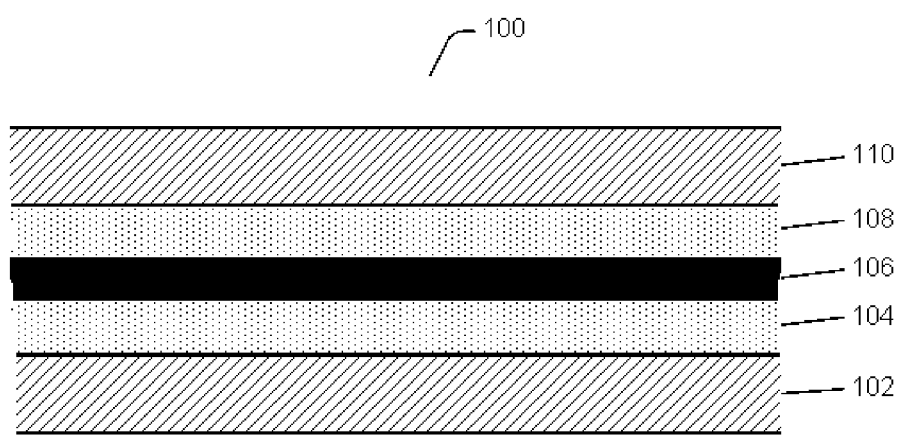
FIG. 1 illustrates an exemplary structure of the laminate, in accordance with an embodiment of the present disclosure.

The present disclosure provides an ultra violet radiation resistant laminate comprising: an outer polyethylene layer comprises at least 10% on the weight of polyethylene, a UV radiation blocking agent or a chromophore; a barrier layer with at least 15%-50% of an aromatic polyamide; and a polyethylene sealant layer. The laminate is capable to achieve complete block of ultra violet radiation in UV-A region (from 385 nm-316 nm), UV-B region (from 315 nm-281 nm), and UV-C region (from 280 nm-200 nm).

Another embodiment of the present disclosure provides an ultra violet radiation resistant laminate comprising: a outer polyethylene layer comprises at least 10% on the weight of polyethylene, a UV radiation blocking agent or a chromophore; a barrier layer with at least 15%-50% of an aromatic polyamide; and a polyethylene sealant layer.

The polyethylene polymer of the outer layer, in accordance with the present disclosure, is a Low Density Polyethylene (LDPE), or a Linear Low Density Polyethylene (LLDPE), a High Density Polyethylene (HDPE); or combination thereof Yet another embodiment of the present disclosure provides an ultra violet radiation resistant laminate comprising: an outer polyethylene layer comprises at least 10% on the weight of Low Density Polyethylene (LDPE), a UV radiation blocking agent or a chromophore; a barrier layer with at least 15%-50% of an aromatic polyamide; and a polyethylene sealant layer.

Further an embodiment of the present disclosure provides an ultra violet radiation resistant laminate comprising: an outer polyethylene layer comprises at least 10% on the weight of Linear Low Density Polyethylene (LLDPE), a UV radiation blocking agent or a chromophore; a barrier layer with at least 15%-50% of an aromatic polyamide; and a polyethylene sealant layer.

An embodiment of the present disclosure provides an ultra violet radiation resistant laminate comprising: an outer polyethylene layer comprises at least 10% on the weight of High Density Polyethylene (HDPE), a UV radiation blocking agent or a chromophore; a barrier layer with at least 15%-50% of an aromatic polyamide; and a polyethylene sealant layer.

Another embodiment of the present disclosure provides an ultra violet radiation resistant laminate comprising: an outer polyethylene layer comprises at least 10% on the weight of mixture of Low Density Polyethylene (LDPE), or a Linear Low Density polyethylene (LLDPE), a High Density Polyethylene (HDPE), a UV radiation blocking agent or a chromophore; a barrier layer with at least 15%-50% of an aromatic polyamide; and a polyethylene sealant layer.

Yet another embodiment of the present disclosure provides an ultra violet radiation resistant laminate comprising: an outer polyethylene layer comprises Low Density Polyethylene (LDPE) and Linear Low Density Polyethylene (LLDPE) in a ratio of 70:30 to 30:70 w/w, a UV radiation blocking agent or a chromophore; a barrier layer with at least 15%-50% of an aromatic polyamide; and a polyethylene sealant layer.

Still another embodiment of the present disclosure provides an ultra violet radiation resistant laminate comprising: an outer polyethylene layer comprises at least 10% on the weight of polyethylene, a UV radiation blocking agent or a chromophore; a barrier layer with at least 15%-50% of an aromatic polyamide; and a polyethylene sealant layer is an opaque laminate or a transparent laminate. The transparent laminate comprises of LDPE or LLDPE, or combination thereof, in the outer polyethylene layer. Advantageously, the amount of LDPE is such that the mechanical strength is retained along with the optical properties. Preferably, the amount of LDPE in the outer polymer layer is about 45%. The addition of HDPE polymer will result in haziness of the laminate. Hence it is an embodiment of this disclosure to provide an opaque UV radiation resistant laminate comprising HDPE in the polyethylene layer.

Further an embodiment of the present disclosure provides an ultra violet radiation resistant laminate comprising: an outer polyethylene layer comprises of 45% Linear low density polyethylene (LLDPE), 45% Low density polyethylene (LDPE) and 10% UV blocking agent; a barrier layer with at least one aromatic polyamide; and a polyethylene sealant layer.

The UV blocking agent present in the outer polyethylene layer is advantageously a UV-A blocking agent. The agent can be an organic chromophore. The UV-A blocking agent that can be used in accordance with the present disclosure are notably commercially available, such as, Milliken's PE CUV 7126.

An embodiment of the present disclosure provides an ultra violet radiation resistant laminate comprising: an outer polyethylene layer is a multilayer film layer comprises at least 10% on the weight of polyethylene, a UV radiation blocking agent or a chromophore; a barrier layer with at least 15%-50% of an aromatic polyamide; and a polyethylene sealant layer. In the laminate wherein the outer polyethylene layer is a multilayer film, such as three layers film, five layers film or seven layers film.

Another embodiment of the present disclosure provides an ultra violet radiation resistant laminate comprising: an outer polyethylene layer comprises at least 10% on the weight of polyethylene, a UV radiation blocking agent or a chromophore is in at least one of the layers; a barrier layer with at least 15%-50% of an aromatic polyamide; and a polyethylene sealant layer.

Still another embodiment of the present disclosure provides an ultra violet radiation resistant laminate comprising: an outer polyethylene layer comprises at least 10% on the weight of polyethylene, a UV radiation blocking agent that is present in the middle layer of a multilayer outer polyethylene layer; a barrier layer with at least 15%-50% of an aromatic polyamide; and a polyethylene sealant layer.

Yet another embodiment of the present disclosure provides an ultra violet radiation resistant laminate comprising: an outer polyethylene layer comprises at least 10% on the weight of polyethylene, a UV radiation blocking agent or a chromophore; a barrier layer is a multilayer film with at least 15%-50% of an aromatic polyamide; and a polyethylene sealant layer.

Still another embodiment of the present disclosure provides an ultra violet radiation resistant laminate comprising: an outer polyethylene layer comprises at least 10% on the weight of polyethylene, a UV radiation blocking agent or a chromophore; a barrier layer with at least 15%-50% of an aromatic polyamide comprises more than 50% of the recurring units of at least one aromatic group and an amide moiety; and a polyethylene sealant layer. The aromaticity of the aromatic recurring units of an aromatic polyamide can come notably from the diacid (or derivative thereof) and/or from the diamine and/or from the amino acid used in the poly condensation reaction. Preferably, the aromatic polyamide of the disclosure comprises at least 20 mol %, based on 100 mol % of monomers making up the polyamide, of monomers comprising an aromatic group. Although not required, such aromatic groups typically originate in a diacid monomer, and include terephthalic acid, isophthalic acid, phthalic acid, etc.

Notably commercially available UV blocking aromatic polyamide such as DuPont's "Selar PA", "Grivory G21" from EMS Chemicals, can also be used in accordance with the disclosure.

Further an embodiment of the present disclosure provides an ultra violet radiation resistant laminate comprising: an outer polyethylene layer comprises at least 10% on the weight of polyethylene, a UV radiation blocking agent or a chromophore; a barrier layer with at least 15%-50% of an amorphous polyamide; and a polyethylene sealant layer.

An embodiment of the present disclosure provides an ultra violet radiation resistant laminate comprising: an outer polyethylene layer comprises at least 10% on the weight of polyethylene, a UV radiation blocking agent or a chromophore; a barrier layer with at least 15%-50% of an aromatic polyamide and optionally with aliphatic polyamide; and a polyethylene sealant layer. The blend of the aromatic polyamide and the aliphatic polyamide, in accordance with the present disclosure, enables better processability and provides good melt strength and tube concentricity. The aliphatic polyamide denotes a polyamide that is compatible with the aromatic polyamide contained in the barrier layer. The aliphatic polyamide is present in an amount ranging from 0% to 50% on the weight of the total polyamide content in the barrier layer. Non limiting examples of such aliphatic polyamides are poly(hexamethylene adipamide) (nylon 66), poly(hexamethylene azelaamide) (nylon 69), poly(hexamethylene sebacamide) (nylon 610), poly(hexamethylene dodecanoamide) (nylon 612), poly(dodecamethylene dodecanoamide) (nylon 1212) and their copolymers. Examples of polyamides obtainable by (and preferably, obtained by) the auto-polycondensation reaction of an amino carboxylic acid and/or a lactam are the polycaprolactame (nylon 6), the polycaproamide and the poly(11-amino-undecano-amide).

Notably commercially available aliphatic polyamide such as "Ultramid B40" can be used in accordance with the present disclosure.

The aliphatic polyamide can be used along with the UV blocking aromatic polyamide in a weight ratio ranging from 15:85 to 85:15, preferably, 25:75 to 75:25, and most preferably 1:1.

Another embodiment of the present disclosure provides an ultra violet radiation resistant laminate comprising: an outer polyethylene layer comprises at least 10% on the weight of polyethylene, a UV radiation blocking agent or a chromophore; a barrier layer with at least 15%-50% of an aromatic polyamide and optionally with semi crystalline polyamide; and a polyethylene sealant layer.

Yet another embodiment of the present disclosure provides an ultra violet radiation resistant laminate comprising: an outer polyethylene layer comprises at least 10% on the weight of polyethylene, a UV radiation blocking agent or a chromophore; a barrier layer is made up of Ethylene Vinyl Alcohol (EVOH) with at least 15%-50% of an aromatic polyamide; and a polyethylene sealant layer.

Still another embodiment of the present disclosure provides an ultra violet radiation resistant laminate comprising: an outer polyethylene layer comprises at least 10% on the weight of polyethylene, a UV radiation blocking agent or a chromophore; a barrier layer with at least 15%-50% of an aromatic polyamide; and a polyethylene sealant layer of Low Density Polyethylene (LDPE).

Further an embodiment of the present disclosure provides an ultra violet radiation resistant laminate comprising: an outer polyethylene layer comprises at least 10% on the weight of polyethylene, a UV radiation blocking agent or a chromophore; a barrier layer with at least 15%-50% of an aromatic polyamide; and a polyethylene sealant layer of Linear Low Density Polyethylene (LLDPE).

Still further an embodiment of the present disclosure provides an ultra violet radiation resistant laminate comprising: an outer polyethylene layer comprises at least 10% on the weight of polyethylene, a UV radiation blocking agent or a chromophore; a barrier layer with at least 15%-50% of an aromatic polyamide; and a polyethylene sealant layer of mixture of Low Density Polyethylene (LDPE) and Linear Low Density Polyethylene (LLDPE).

Another embodiment of the present disclosure provides an ultra violet radiation resistant laminate comprising: an outer polyethylene layer comprises at least 10% on the weight of polyethylene, a UV radiation blocking agent or a chromophore; a barrier layer with at least 15%-50% of an aromatic polyamide; and a polyethylene sealant layer comprises of Low Density Polyethylene (LDPE) and Linear Low Density Polyethylene (LLDPE) in 1:1 weight ratio.

The present disclosure further provides an ultra violet radiation resistant laminate comprising: an outer polyethylene layer comprises at least 10% on the weight of polyethylene, a UV radiation blocking agent or a chromophore; a tie layer of Maleic Anhydride Grafted Polyethylene; a barrier layer with at least 15%-50% of an aromatic polyamide; a tie layer of Maleic Anhydride Grafted Polyethylene; and a polyethylene sealant layer. The EVOH layer is either tied on one side with said Polyamide layer and on other side with Maleic Anhydride Grafted (MAH) Polyethylene. Incorporation of EVOH layer makes the film and ultimately the laminate where such a co-extruded film is a component of the laminate a good Oxygen Barrier.

The laminate in accordance with the present disclosure, when scanned under 500 nm to 200 nm, shows strong absorption from 380 nm to 200 nm, thereby resulting in <1.0% of UV light Transmission.

The outer layer is of 100µ thickness having multi-layers coextruded film of varying thickness. The outer polyethylene layer is formed by co-extruding three layers, the first layer with 25µ, second layer with 50µ and third layer with 25µ thickness.

An embodiment of the present disclosure provides a laminate comprising: an outer polyethylene layer (110) comprises at least 10% on the weight of polyethylene, a UV radiation blocking agent or a chromophore having a thickness of 100µ; a tie layer (108) of maleic anhydride grafted polyethylene; a barrier layer (106) with at least 15%-50% of an UV blocking aromatic polyamide having a thickness of 79µ; a tie layer (104) of maleic anhydride grafted polyethylene; and a polyethylene sealant layer (102), wherein, the outer polyethylene layer is a multilayer film, preferably three layer film.

Another embodiment of the present disclosure provides a laminate comprising: an outer polyethylene layer (210) comprises at least 10% on the weight of polyethylene, a UV radiation blocking agent or a chromophore; a polyethylene tie layer (211); a polyethylene layer (209) containing LDPE and LLDPE; a tie layer (208) of maleic anhydride grafted polyethylene; a polyamide layer (206) comprises UV blocking amorphous aromatic polyamide and semi crystalline aliphatic polyamide; a barrier layer (205) with at least 15%-50% of an UV blocking aromatic polyamide; a polyamide layer (207) comprises UV blocking amorphous aromatic polyamide and semi crystalline aliphatic polyamide; a tie layer (204) of maleic anhydride grafted polyethylene; a polyethylene layer (203) containing LDPE and LLDPE; a polyethylene tie layer (201); and a polyethylene sealant layer (202), wherein, the outer polyethylene layer is a multilayer film, preferably three layer film.

In one of the embodiment, FIG. 1 illustrates an exemplary structure of the laminate. The laminate 100, according to FIG. 1, comprising: an outer polyethylene layer (110) comprises at least 10% on the weight of polyethylene, a UV radiation blocking agent or a chromophore having a thickness of 100µ, wherein the outer layer is a multilayer film, preferably three layer film; a tie layer (108) of maleic grafted polyethylene; a barrier layer (106) with at least 15%-50% of an UV blocking aromatic polyamide having a thickness of 79µ; a tie layer of maleic anhydride grafted polyethylene (104); and a polyethylene sealant layer (102). The outer layer (110) serves as a printing layer and the inner layer (102) serves as a sealant layer.

Figure 2:
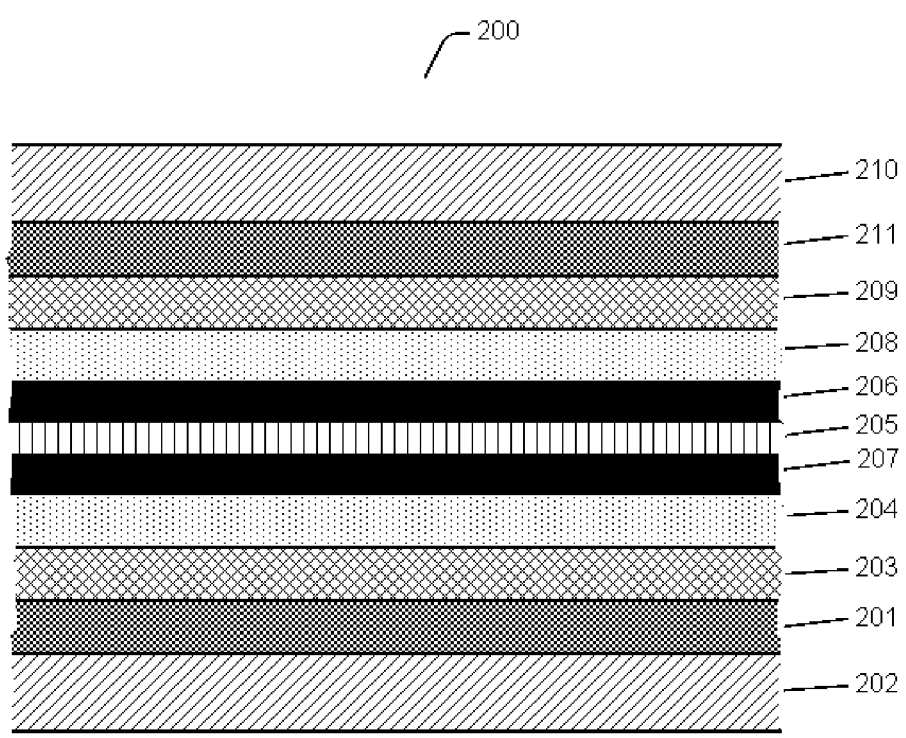
FIG. 2 illustrates an exemplary structure of the laminate, in accordance with another embodiment of the present disclosure.

In another embodiment, FIG. 2 illustrates an exemplary structure of a laminate with an EVOH barrier layer, in accordance with the present disclosure. The laminate, 200 comprising: an outer polyethylene layer (210) comprises at least 10% on the weight of polyethylene, a UV radiation blocking agent or chromophore, wherein the outer layer is a multilayer, preferably three layer film, of for example, 25µ, 50µ, and 25µ, each; a polyethylene tie layer (211); a polyethylene layer (209) containing LDPE and LLDPE; a tie layer (208) of maleic anhydride grafted polyethylene; a polyamide layer (206) comprises UV blocking amorphous aromatic polyamide and semi crystalline aliphatic polyamide; a barrier layer (205) with at least 15%-50% of an UV blocking aromatic polyamide; a polyamide layer (207) comprises UV blocking amorphous aromatic polyamide and semi crystalline aliphatic polyamide; a tie layer (204) of maleic anhydride grafted polyethylene; a polyethylene layer (203) containing LDPE and LLDPE; a polyethylene tie layer (201); and a polyethylene sealant layer (202).

In one of the embodiment of the disclosure, the barrier layer is made of seven layers film of total thickness of 79µ as given below:

| Layer no | Material | Thickness in μ |
|---|---|---|
| 1 | 90% LLDPE AND 10% LDPE | 20 |
| 2 | 80% LLDPE And 20% MALEIC ANHYDRIDE GRAFTED POLYETHYLENE | 12 |
| 3 | 50% PA 6 AND 50% AROMATIC POLYAMIDE | 5 |
| 4 | EVOH | 5 |
| 5 | 50% PA 6 AND 50% AROMATIC POLYAMIDE | 5 |
| 6 | 80% LLDPE And 20% MALEIC ANHYDRIDE GRAFTED POLYETHYLENE | 12 |
| 7 | 90% LLDPE AND 10% LDPE | 20 |

The present disclosure further provides a process for preparation of the laminate. The outer layer, barrier layer and sealant layer are individually co-extruded as films. Then outer layer and barrier layers are adhered through extrusion lamination with another 20μ Low density polyethylene (LDPE) material. The above extrusion laminated outer and barrier layer is further adhered with sealant layer by extrusion lamination of 20μ Low density polyethylene (LDPE) layer.

The total thickness of the laminate is in the range between 200μ to 550μ preferably between 275 to 475μ.

An embodiment of the present disclosure provides a process for preparation of the laminate comprising: co-extruding outer layer, barrier layer and sealant layers independently as films; adhering through extrusion lamination of outer layer, barrier layer and one 20μ Low density polyethylene (LDPE) material film; and adhering the sealant layer by extrusion lamination of 20μ Low density polyethylene (LDPE) layer.

Although the subject matter has been described in considerable detail with reference to certain preferred embodiments thereof, other embodiments are possible. As such, the spirit and scope of the disclosure should not be limited to the description of the preferred embodiment contained therein.

We claim:

1. An Ultra Violet radiation resistant laminate comprising:
an outer polyethylene layer, which comprises at least 10% of a UV radiation blocking agent based on the total weight of the polyethylene;
a barrier layer; and
a polyethylene sealant layer,
wherein, the laminate is transparent and capable of preventing UV-radiation in UV-A region (from 380 nm-315 nm), UV-B region (from 315 nm-280 nm), and UV-C region (from 280 nm-200 nm), and
wherein the barrier layer is a seven-layer film of total thickness 79μ consisting of:
a first layer and a seventh layer, which consist of 90% by weight of LLDPE and 10% by weight of LDPE, each of the first and seventh layer having a thickness of 20μ;
a second layer and a sixth layer, which consist of 80% by weight of LLDPE and 20% by weight of Maleic Anhydride Grafted Polyethylene, each of the second and sixth layer having a thickness of 12μ;
a third layer and a fifth layer, which consist of 50% by weight of PA 6 and 50% by weight of aromatic polyamide, each of the third and fifth layer having a thickness of 5μ; and
a fourth layer, which comprises 90% Ethylene Vinyl Alcohol (EVOH) having a thickness of 5μ.

2. The laminate as claimed in claim 1, wherein the outer polyethylene layer comprises 45% by weight of Linear low density polyethylene (LLDPE), 45% by weight of Low density polyethylene (LDPE) and 10% by weight of UV blocking agent.

3. The laminate as claimed in claim 1, wherein the aromatic polyamide in the barrier layer is an amorphous polyamide.

4. The laminate as claimed in claim 1, wherein the polyethylene sealant layer comprises of Low Density Polyethylene (LDPE), Linear Low Density Polyethylene (LLDPE), or combination thereof.

5. The laminate as claimed in claim 1, wherein the sealant polyethylene layer comprises of LDPE and LLDPE in 1:1 weight ratio.

6. The laminate as claimed in claim 1, further comprising:
a tie layer of maleic anhydride grafted polyethylene.

7. The laminate as claimed in claim 1 wherein the outer polyethylene layer comprises of a Low Density Polyethylene (LDPE), or a Linear Low Density Polyethylene (LLDPE), a High Density Polyethylene (HOPE); or combination thereof.

8. The laminate as claimed in claim 1, wherein the outer polyethylene layer comprises of Low Density Polyethylene (LDPE) and Linear Low Density Polyethylene (LLDPE) in a ratio of 70:30 to 30:70 w/w.

9. A laminate comprising:
an outer polyethylene layer having a thickness of 100μ, which comprises at least 10% of a UV Radiation blocking agent on the total weight of the polyethylene or a chromophore;
a first lamination layer of polyethylene;
a barrier layer;
a second lamination layer polyethylene; and
a polyethylene sealant layer,
wherein, the outer polyethylene layer is a multilayer film, and
the outer polyethylene layer comprises of Low Density Polyethylene (LOPE) and Linear Low Density Polyethylene (LLDPE) in a ratio of 70:30 to 30:70 w/w, and
wherein, the laminate is transparent and capable of preventing UV-radiation in UV-A region (from 380 nm-315 nm UV-B region (from 315 nm-280 nm), and UV-C region (from 280 nm-200 nm),
wherein the barrier layer is a seven-layer film of total thickness 79μ consisting of:
a first layer and a seventh layer, which consist of 90% by weight of LLDPE and 10% by weight of LDPE, each of the first and seventh layer having a thickness of 20μ;
a second layer and a sixth layer, which consist of 80% by weight of LLDPE and 20% by weight of Maleic Anhydride Grafted Polyethylene, each the second and sixth layer having a thickness of 12μ:
a third layer and a fifth layer, which consist of 50% by weight of PA 6 and 50% by weight of aromatic polyamide, each of the third and fifth layer having a thickness of 5μ: and
a fourth layer, which comprises 90% Ethylene Vinyl Alcohol (EVOH) having a thickness of 5μ.

10. A laminate comprising:
an outer polyethylene layer (210) that comprises at least 10% of a UV Radiation blocking agent on the total weight of the polyethylene or a chromophore;
a polyethylene lamination layer (211);
a barrier layer made of seven layers of film of total thickness 79μ consists of the following layers in order:
a polyethylene layer (209) containing LDPE and LLDPE;

a tie layer (208) of maleic anhydride grafted polyethylene;

a polyamide layer (206), which comprises UV blocking amorphous aromatic polyamide and semi crystalline aliphatic polyamide in a weight ratio of 1:1;

a barrier core layer (205) with comprising Ethylene Vinyl Alcohol (EVOH) and from 15% to 50% by weight of an UV blocking aromatic polyamide;

a polyamide layer (207), which comprises UV blocking amorphous aromatic polyamide and semi crystalline aliphatic polyamide in a weight ratio of 1:1;

a tie layer (204) of maleic anhydride grafted polyethylene;

a polyethylene layer (203) containing LDPE and LLDPE;

a polyethylene lamination layer (201); and a polyethylene sealant layer (202), wherein, the outer polyethylene layer is a multilayer film, which comprises Low Density Polyethylene (LDPE) and Linear Low Density Polyethylene (LLDPE) in a ratio of 70:30 to 30:70 w/w, and wherein, the laminate is transparent and capable of preventing UV-radiation in UV A region (from 380 nm-315 nm), UV-B region (from 315 nm-280 nm), and UV-C region (from 280 nm-200 nm).

11. A process for preparation of the laminate as claimed in claim 1, said process comprising:

co-extruding outer layer, barrier layer and sealant layers independently as films;

adhering through extrusion lamination of outer layer, barrier layer and one 20μ Low density polyethylene (LDPE) material film; and adhering the sealant layer by extrusion lamination of 20μ Low density polyethylene (LDPE) layer.

\* \* \* \* \*